US011938846B2

United States Patent
Parker et al.

(10) Patent No.: US 11,938,846 B2
(45) Date of Patent: Mar. 26, 2024

(54) PASSENGER SEAT TRACK FITTING SYSTEMS AND METHODS

(71) Applicant: Safran Seats USA LLC, Gainesville, TX (US)

(72) Inventors: Charles Michael Parker, Irvine, CA (US); Romain Tranier, Costa Mesa, CA (US); Reza Mansouri, Costa Mesa, CA (US)

(73) Assignee: Safran Seats USA LLC, Gainesville, TX (US)

( * ) Notice: Subject to any disclaimer, the term of this patent is extended or adjusted under 35 U.S.C. 154(b) by 505 days.

(21) Appl. No.: 17/279,837

(22) PCT Filed: Sep. 26, 2018

(86) PCT No.: PCT/US2018/052817
§ 371 (c)(1),
(2) Date: Mar. 25, 2021

(87) PCT Pub. No.: WO2020/068061
PCT Pub. Date: Apr. 2, 2020

(65) Prior Publication Data
US 2022/0032821 A1 Feb. 3, 2022

(51) Int. Cl.
*B60N 2/08* (2006.01)
*B64D 11/06* (2006.01)

(52) U.S. Cl.
CPC ........ *B60N 2/0806* (2013.01); *B64D 11/0696* (2013.01)

(58) Field of Classification Search
CPC .......................... B60N 2/0806; B64D 11/0696
See application file for complete search history.

(56) References Cited

U.S. PATENT DOCUMENTS

| 5,005,243 A | 4/1991 | Yip |
| 5,337,979 A * | 8/1994 | Bales ................. B64D 11/0696 244/122 R |

(Continued)

FOREIGN PATENT DOCUMENTS

| CN | 205674129 U | 11/2016 |
| EP | 1794053 B1 | 6/2009 |

(Continued)

OTHER PUBLICATIONS

International Patent Application No. PCT/US2018/052817, International Search Report and Written Opinion, dated May 3, 2019.

(Continued)

*Primary Examiner* — Philip F Gabler
(74) *Attorney, Agent, or Firm* — Kilpatrick Townsend & Stockton LLP (57) ABSTRACT

A system for securing a passenger seat to a track can include a fitting coupled with or forming a portion of the passenger seat; a shear plunger coupled with the fitting including a shear plunger body defining a shear plunger locking surface; a guide pin assembly that may include a guide pin movable along a lift axis between a retracted state and an extended state and a locking member extending laterally from the guide pin that may travel in response to a movement of the guide pin from the retracted state to the extended state and may engage the shear plunger locking surface in response to a rotation of the guide pin in the extended state; and a quick install tool operable to raise and twist the guide pin assembly such that the locking member is held in tension against the shear plunger locking surface.

10 Claims, 9 Drawing Sheets

(56) References Cited

U.S. PATENT DOCUMENTS

| | | | | |
|---|---|---|---|---|
| 5,489,172 | A | * | 2/1996 | Michler ............. B64D 11/0696 410/104 |
| 5,820,107 | A | | 10/1998 | Hall |
| 5,871,318 | A | * | 2/1999 | Dixon ................ B60N 2/01558 410/104 |
| 5,975,822 | A | * | 11/1999 | Ruff .................. B64D 11/0696 411/85 |
| 6,312,037 | B1 | | 11/2001 | Garrido et al. |
| 7,641,426 | B2 | * | 1/2010 | Stubbe .................... F16B 7/187 410/104 |
| 8,292,224 | B1 | | 10/2012 | Ahad et al. |
| 10,464,445 | B2 | * | 11/2019 | Trimble ............ B64D 11/0696 |
| 10,829,225 | B2 | * | 11/2020 | Doughty ........... B64D 11/0696 |
| 2013/0200583 | A1 | | 8/2013 | Morris et al. |
| 2019/0315473 | A1 | * | 10/2019 | Mochizuki ......... B64D 11/0648 |
| 2022/0032821 | A1 | * | 2/2022 | Parker ................. B60N 2/0806 |

FOREIGN PATENT DOCUMENTS

| | | | |
|---|---|---|---|
| GB | 2219493 | A | 12/1989 |
| WO | 1997029042 | A1 | 8/1997 |
| WO | 2006034855 | A1 | 4/2006 |

OTHER PUBLICATIONS

European Patent Application No. 18783330.6, Communication pursuant to Article 94(3) EPC dated Dec. 7, 2022.

* cited by examiner

PASSENGER SEAT TRACK FITTING SYSTEMS AND METHODS

FIELD OF THE INVENTION

The field of the invention relates to seat mounting assemblies for passenger vehicles such as aircraft.

BACKGROUND

Many vehicle seats such as those on passenger aircraft, buses, trains, and the like are removably mounted in a track secured to the floor of the vehicle. The tracks typically include a channel along their entire length, where two lips partially enclose the upper side of the channel to form a slot. Semicircular cutout portions are uniformly spaced along the lips to create a series of larger circular openings in the slot. Typically, a track fitting assembly is used to couple the passenger seat to the track, where the track fitting assembly includes an aft fitting that has studs that extend outwardly from the track fitting body. The studs are typically designed with a flared end attached to a narrower neck. The flared ends of the studs pass through the larger circular openings (e.g., in a vertical direction), and the track fitting assembly is moved along the track (e.g., in a horizontal direction) until the flared ends contact the underside of the slot lips. Standard threaded fasteners or wedge-type elements are commonly used to create a snug fit between the studs and the track lips to prevent seat rattle and unintended seat displacement.

Depending on the pitch of the thread of the standard threaded fasteners used in the track fitting assembly, multiple full rotations of the tool used to tighten the threaded fastener are needed to properly torque the track fitting assembly to the track. Requiring multiple full rotations ultimately results in an increase in the total installation time for all seat assemblies in the vehicle as each vehicle seat typically has a minimum of two track fitting assemblies.

Single-action fittings have been developed where the track fitting assembly does not require any standard fastener (e.g., a threaded fastener) to constrain the fitting. For example, some instead utilize a lever that is part of the single-action fitting and can be pushed down and locked to create a small clamping force. Thus only a single-action is required to install each track fitting assembly to the track.

A challenge faced by single-action fittings relates to the clamping force that creates the snug fit between the studs and the track lips. With a standard threaded fastener, increasing the number of rotations increases the amount of torque and thus the clamping force achieved on the track fitting assembly mounted to the track. In contrast, single-action track fitting assemblies often rely on leverage to achieve the same articulation and the resulting clamping force may be limited by characteristics of a spring, locking fixture, and/or whatever other mechanism is used to retain the single-action fitting in the leveraged state. Another challenge faced by single-action fittings is that levers and locking features add additional weight to each track fitting assembly.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a system for securing a passenger seat to a track may include a fitting, a shear plunger, and a guide pin assembly. The fitting can be coupled with or form a portion of the passenger seat. The fitting can include a fitting body defining a fitting opening. The shear plunger can be coupled with the fitting. The shear plunger can include a shear plunger body defining a shear plunger opening and a shear plunger locking surface adjacent at least a portion of the shear plunger opening. The guide pin assembly can include a guide pin received at least partially in the fitting opening and movable along a lift axis between a retracted state and an extended state. The guide pin assembly can further include a locking member extending laterally from the guide pin and sized for traveling through at least a portion of the shear plunger opening in response to a movement of the guide pin from the retracted state to the extended state. The locking member can engage the shear plunger locking surface in response to a rotation of the guide pin in the extended state.

The fitting may include at least one stud extending from a lower portion of the fitting and configured to contact a lower surface of the track in response to the movement of the guide pin from the retracted state to the extended state to clamp the shear plunger and the fitting to the track.

In some embodiments, the guide pin assembly further includes a biasing member biasing the guide pin toward the retracted state.

The fitting opening and the shear plunger opening, in certain embodiments, align as a result of a pivoting of the shear plunger body relative to the fitting body to permit the guide pin to extend at least partially through both the fitting opening and the shear plunger opening in the extended state and in the retracted state.

The guide pin, in some embodiments, includes a locking member opening in which the locking member is received.

The guide pin may include a flared portion at or adjacent a distal segment of the guide pin, a notch located at or adjacent a proximal segment of the guide pin, and a retaining section located between the notch and the flared portion.

In certain embodiments, the retaining section includes a portion of the guide pin with a diameter that is smaller than the diameter of the guide pin adjacent to the retaining section and the guide pin assembly may further include a retaining member coupled with the retaining section.

In some embodiments, the system further includes a quick install tool operable to raise and twist the guide pin assembly such that the locking member is held in tension against the shear plunger locking surface.

The quick install tool may include a body defining at least one slot and a handle positioned to at least partially surround the body. The handle may include an engaging member sized to engage a notch of the guide pin. And the slot may be sized to permit at least one of the engaging member or the locking member to translate along a longitudinal distance of the slot.

The quick install tool, in certain embodiments, includes: a handle; a cam profile; a cross bar sized to engage a notch of the guide pin; and a holding member spaced apart from the cross bar to define a space for receiving the guide pin.

The quick install tool may be removably attached to the guide pin by placing the holding member around the guide pin and inserting the cross bar into the notch in the guide pin.

According to certain embodiments of the present invention, a quick install tool includes: a handle having a first end and a second end; a cam profile along the first end of the handle; a cross bar coupled with the first end of the handle and sized to engage a notch; and a holding member spaced apart from the cross bar to define a space between the cross bar and the holding member for receiving a pin-shaped member.

In some embodiments, the cross bar is attached away from a geometric center of the cam profile such that an axis of rotation of the cam profile extending through the cross bar is non-concentric to the cam profile to facilitate a lifting of a guide pin.

The quick install tool, in certain embodiments is configured to secure a seat track fitting assembly to a track by the quick install tool raising and twisting a guide pin of the seat track fitting assembly to clamp a shear plunger of the seat track fitting assembly and a fitting member of the seat track fitting assembly to the track.

The quick install tool may be configured to operate relative to a guide pin assembly that includes the guide pin, a biasing member, and a locking member. The notch may be located on the guide pin. The quick install tool may be configured to engage the guide pin by inserting the guide pin through the holding member and inserting the cross bar into the notch on the guide pin. The quick install tool so engaged with the guide pin may be operable to (a) perform the raising of the guide pin to lift the guide pin against a force exerted by the biasing member and (b) perform the twisting of the guide pin to cause engagement of the locking member.

According to certain embodiments of the present invention, a method for securing a passenger seat to a track may be provided. The method can include, relative to a passenger seat track fitting assembly that forms or is coupled with a portion of the passenger seat, lifting a guide pin of the passenger seat track fitting assembly to a lifted position along a lift axis. The method can further include twisting the guide pin in the lifted position at least partially about the lift axis to align a locking member of the guide pin for engagement with a shear plunger locking surface of a shear plunger.

In some embodiments, the method further includes attaching a quick install tool to the passenger seat track fitting assembly. The lifting the guide pin may be performed using the quick install tool. The twisting the guide pin may also be performed using the quick install tool.

In certain embodiments, attaching the quick install tool to the passenger seat track fitting assembly includes placing the quick install tool on the guide pin such that the guide pin is captured between a holding member of the quick install tool and another portion of the quick install tool. Attaching the quick install tool to the passenger seat track fitting assembly can further include inserting a cross bar of the quick install tool into a notch of the guide pin.

Lifting the guide pin of the passenger seat track fitting assembly along the lift axis using the quick install tool may include pressing a handle of the quick install tool downwards. Twisting the guide pin at least partially about the lift axis using the quick install tool may include rotating the handle at least partially about the lift axis. In some embodiments, the method further includes removing the quick install tool from the passenger seat track fitting assembly. Removing the quick install tool from the passenger seat track fitting assembly may include: lifting the handle upwards and removing the quick install tool from the guide pin.

The method may further include engaging a body of the quick install tool with an upper surface of the shear plunger and applying a downward force on the upper surface of the shear plunger via the body of the quick install tool. In some embodiments, lifting the guide pin of the passenger seat track fitting assembly along the lift axis using the quick install tool includes pulling a handle of the quick install tool upwards relative to the body of the quick install tool. Furthermore, twisting the guide pin at least partially about the lift axis using the quick install tool can include rotating the handle of the quick install tool relative to the body of the quick install tool.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide a seat track fitting assembly for passenger seats. While the seat track fitting assembly are discussed for use with aircraft seats, they are by no means so limited. Rather, embodiments of the seat track fitting assembly may be used in passenger seats or other seats of any type or otherwise as desired. For example, embodiments may be used on trains, buses, movie theaters, student seating, or any other instance when securely anchored seats may be useful.

Figure 1:
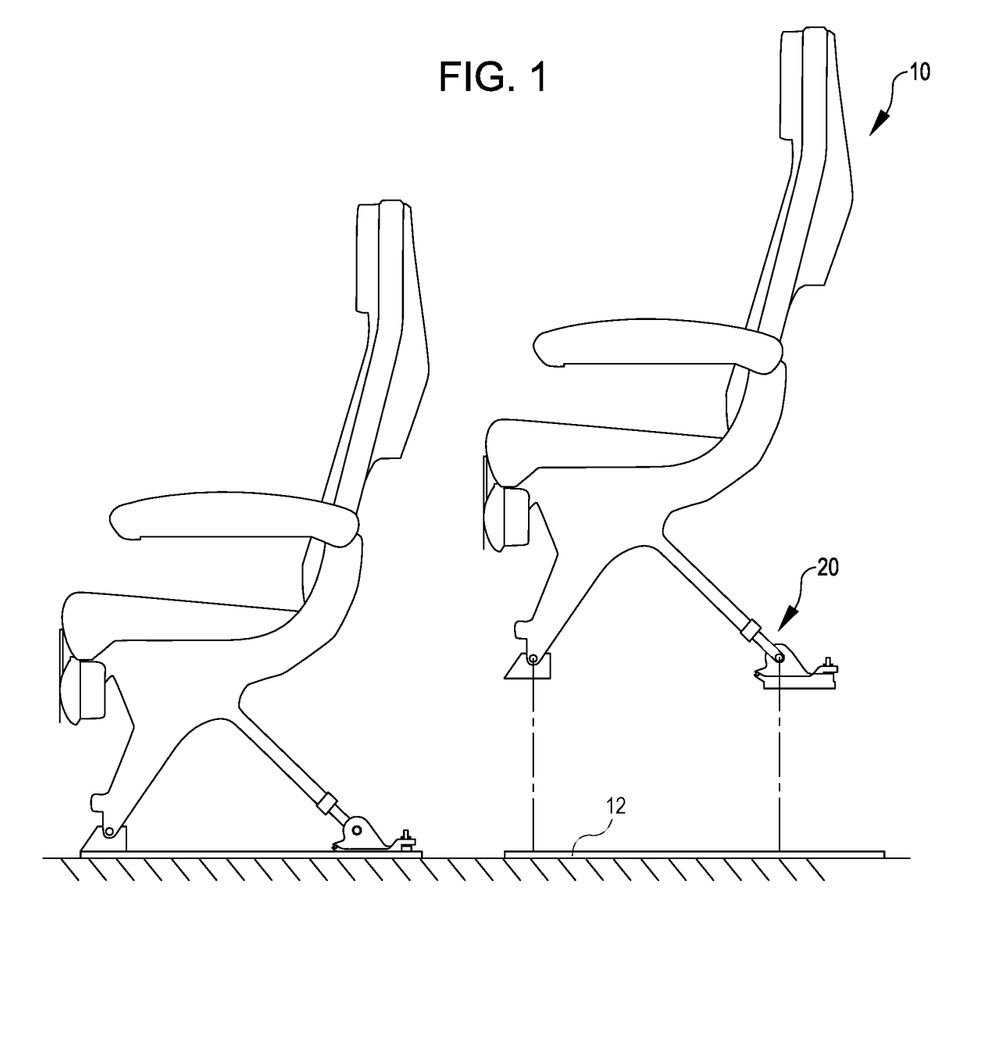
FIG. 1 is a side view of passenger seats secured to a track using a seat track fitting assembly, according to certain embodiments of the present invention.
Figure 2:
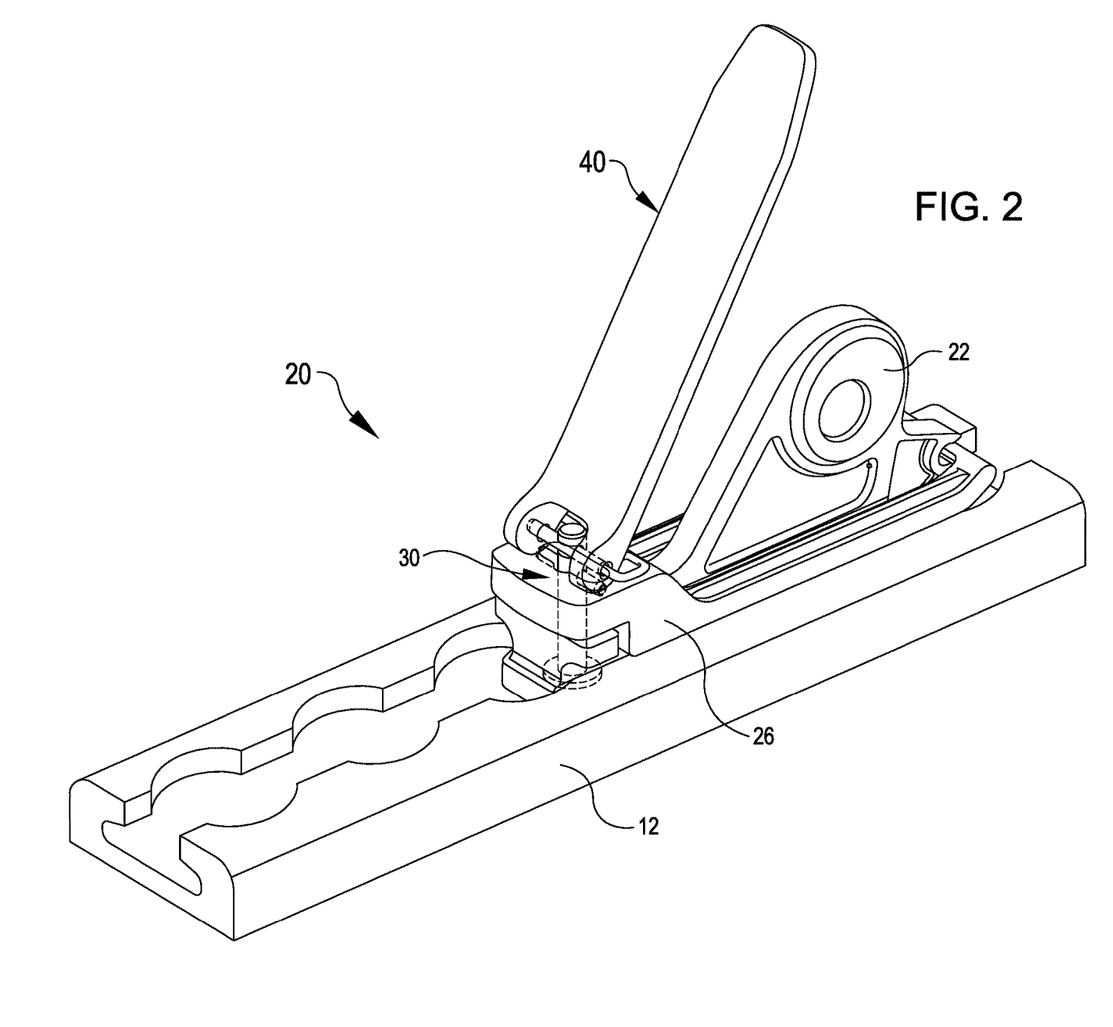
FIG. 2 is a perspective view of the track and seat track fitting assembly of FIG. 1 with a quick install tool attached to the seat track fitting assembly.

According to certain embodiments of the present invention, as shown in FIGS. 1-12, a seat track fitting assembly 20 can include a fitting 22, a shear plunger 26, a guide pin assembly 30, and a quick install tool 40. As shown in FIG. 1, the seat track fitting assembly 20 may be configured to secure a passenger seat 10 to a track 12. The seat track fitting assembly 20 may be formed of materials including but not limited to aluminum, stainless steel, aramid fibers, polycarbonate, polypropylene, other metallic materials, composite materials, or other similar materials that are able to provide the necessary structural integrity for securing the seat track fitting assembly 20 to a track 12. Additionally, each feature of the seat track fitting assembly 20 may be formed of the same materials or of different materials.

The fitting 22 may be integrally formed or otherwise coupled with a portion of the passenger seat 10. The fitting 22 shown in FIGS. 2 and 3 may include a fitting body 23 which defines a fitting opening 24 and at least one stud 25 that extends from a lower portion of the fitting body 23. In some embodiments, the at least one stud 25 is configured to contact a lower surface of the track 12 (e.g., on an underside of inturned lips of the track) to secure the fitting to the track 12 as a result of movement of the guide pin assembly 30. This contact and movement is discussed in more detail below in relation to FIGS. 5-8.

The shear plunger 26 may be coupled with the fitting 22. The shear plunger 26 may include a shear plunger body 27 which defines a shear plunger opening 28 and a shear plunger locking surface 29. The shear plunger locking surface 29 may be adjacent to at least a portion of the shear plunger opening 28. In some embodiments, the shear plunger locking surface 29 surrounds the entirety of shear plunger opening 28. Although the shear plunger locking surface 29 is shown on a top side of the shear plunger body 27, in some embodiments, the shear plunger locking surface 29 may correspond to a surface recessed within the shear plunger body 27. Additionally, the shear plunger 26 may be pivotally coupled with the fitting 22 such that the shear plunger 26 may rotate or pivot relative to the fitting 22 to permit the seat track fitting assembly to slide into the track 12 when the shear plunger 26 is rotated away from the fitting 22. For example, the fitting 22 and the shear plunger 26 may include a snap fit or hinge connection that permits the shear plunger 26 to pivot.

The guide pin assembly 30 may include a guide pin 31 and a locking member 32. The guide pin 31 can include a proximal segment and a distal segment. For example, the proximal segment may be proximal to a space accessible by the quick install tool 40, while the distal segment may be distal to such a space. The guide pin 31 may be received, at least partially, in the fitting opening 24.

In some embodiments, the guide pin 31 may also be received, at least partially, in the shear plunger opening 28. The fitting opening 24 and the shear plunger opening 28 may align as a result of pivoting the shear plunger body 27 relative to the fitting body 23. The shear plunger opening 28 is shaped to permit the guide pin 31 to pass through the shear plunger opening 28 as the shear plunger 26 rotates relative to the fitting 22. The shear plunger opening 28 may also be shaped to the permit the locking member 32 to pass through the shear plunger opening 28 at one orientation of the locking member 32 and to prevent passage of the locking member 32 when the locking pin 32 has been moved to another orientation (such as rotated by 90° or other suitable angle). The guide pin 31 may be moveable through both the shear plunger opening 28 and the fitting opening 24 along a lift axis between a retracted state and an extended state, as will be discussed in further detail below in relation to FIGS. 5-8 and 11-12.

The locking member 32 may extend laterally from the guide pin 31, e.g., such that the locking member 32 is substantially perpendicular to the lift axis of the guide pin 31. In some embodiments, the locking member 32 may extend at any suitable angle or angles from the guide pin 31. Additionally, the locking member 32 may be sized to travel through at least a portion of the shear plunger opening 28 as the guide pin 31 moves between the retracted state and the extended state. For example, in the retracted state, the locking member 32 may be located below the shear plunger locking surface 29. In the extended state, the locking member 32 may be located above the shear plunger locking surface 29. Additionally, in the extended state, the guide pin 31 may be rotated or twisted so the locking member 32 engages the shear plunger locking surface 29.

Figures 3, 4:
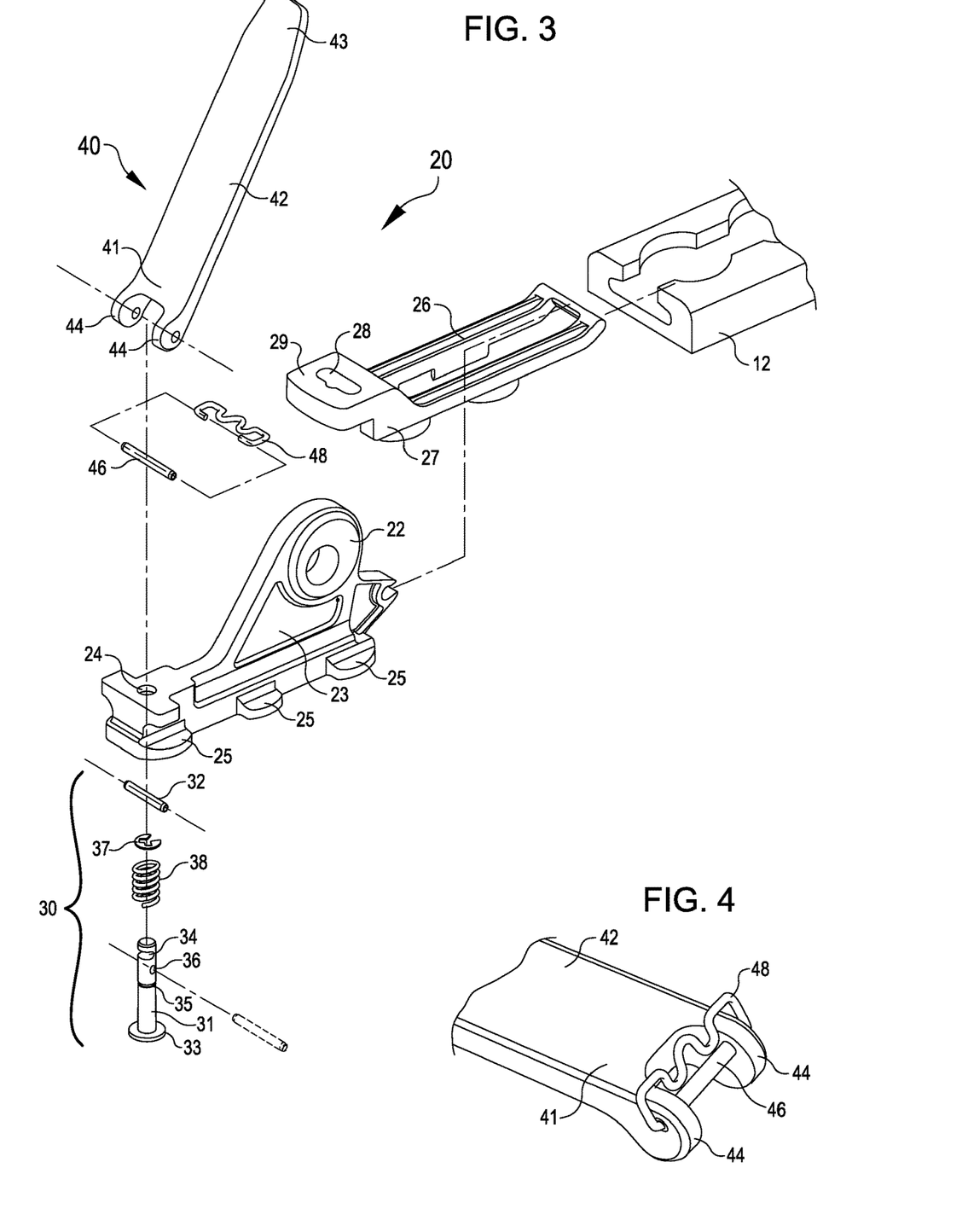
FIG. 3 is an exploded view of the elements of FIG. 2.
FIG. 4 is a partial perspective view of the quick install tool of FIG. 2.
Figure 5:
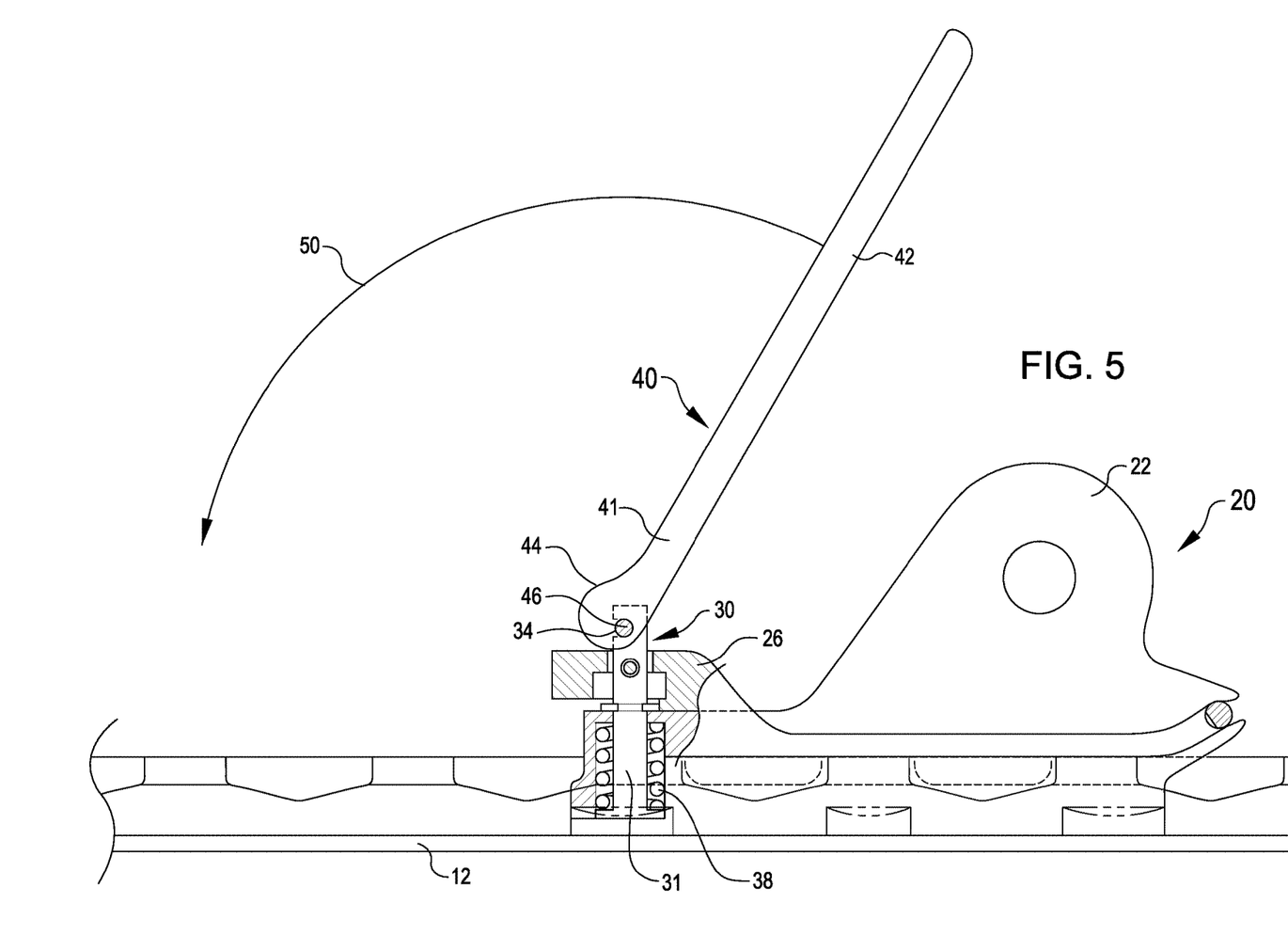
FIG. 5 is a side view of the elements of FIG. 2.

In some embodiments, the guide pin assembly 30 may include a biasing member 38 positioned in an inner cavity of the fitting 22, as shown in FIGS. 5-8, that biases the guide pin 31 towards the retracted state. As shown in FIG. 3, the biasing member 38 may be a compression spring. Additionally, the biasing member 38 may be a disc spring, as discussed below in relation to FIGS. 11 and 12.

In some embodiments (such as in FIGS. 2 and 3), the guide pin 31 may include a flared portion 33, a notch 34, a retaining section 35, and a locking member opening 36. The flared portion 33 may be located at or adjacent to the distal segment of the guide pin 31. In some embodiments, the flared portion 33 forms a portion of the guide pin 31 that has a larger diameter than the diameter of the guide pin 31 adjacent to the flared portion 33. Additionally, the flared portion 33 may form a portion of the guide pin 31 with a relevant cross-sectional dimension, including along a slope or other gradual transition, being larger than that of the adjacent portion of the guide pin 31. The biasing member 38 may apply a force to the flared portion 33 to bias the guide pin 31 towards the retracted state. For example, the biasing member 38 may be positioned or captured between the flared portion 33 of the guide pin 31 and a portion on an underside of the fitting body 23 about the fitting opening 24 and compress in response to movement of the guide pin 31. The notch 34 may be located at or adjacent to the proximal segment of the guide pin 31, and will be discussed further below in relation to FIGS. 5-8.

The retaining section 35 may be located between the notch 34 and the flared portion 33. In some embodiments, the retaining section 35 includes a portion of the guide pin 31 where the diameter of the retaining section 35 is smaller than the diameter of the guide pin 31 adjacent to the retaining section 35. A retaining member 37 may be coupled with the retaining section 35. The retaining member 37 may be snap fit to the retaining section 35 or may be attached to the retaining section 35 in any other suitable manner. For example, the retaining member 37 may couple to the retaining section 35 so that the retaining member 37 rests on the fitting 22 when the guide pin 31 in in the retracted state. Thus, the retaining member 37 may aid in retaining the guide pin 31 in the seat track fitting assembly 20 during installation and any transportation of the seat track fitting assembly 20.

Additionally, the guide pin 31 may include a locking member opening 36 in which the locking member 32 may be received. In some embodiments, the locking member opening 36 may be located between the notch 34 and the retaining section 35. The locking member 32 may be friction fit inside the locking member opening 36, may be adhered to the inside of the locking member opening 36 using an adhesive, or may be secured to the inside of the locking member opening 36 using any other suitable method. In some embodiments, the guide pin 31, the locking member 32, and the flared portion 33 are molded together as a single unit.

In some embodiments (such as in FIGS. 2-4), the seat track fitting assembly 20 may include a quick install tool 40. The quick install tool 40 may be removably attached to the seat track fitting assembly 20 or may be integrally formed with the seat track fitting assembly 20. The quick install tool 40 may be operable relative to the guide pin assembly 30. For example, the quick install tool 40 may be operable to raise and twist the guide pin assembly 30, as discussed below in relation to FIGS. 5-8, such that the locking member 32 is held in tension against the shear plunger locking surface 29. Additionally, the quick install tool 40 may be any suitable tool capable of raising and twisting the guide pin assembly 30, as discussed below in relation to FIG. 10.

In some embodiments, the quick install tool 40 may comprise a handle 42, a cam profile 44, a cross bar 46, and a holding member 48. The handle 42 may include a first end 41 and a second end 43 where the cam profile 44 is located along the first end 41.

In some embodiments, the cross bar 46 may be coupled with the first end 41 and may be sized to engage the notch 34 of the guide pin 31 as the quick install tool 40 is attached to the guide pin assembly 30. The cross bar 46 may be attached away from the geometric center of the cam profile 44 (such as in FIG. 4).

In some embodiments, the holding member 48 may also be coupled with the first end 41 and may be spaced apart from the cross bar 46 to define a space between the cross bar 46 and the holding member 48 for receiving the guide pin 31. The holding member 48 may be any suitable shape such that the holding member 48 may rotate about the first end 41 and may also receive the guide pin 31. Additionally, the holding member 48 may aid in maintaining the positioning of the quick install tool 40 relative to the guide pin 31 during any movement of the quick install tool 40.

In some embodiments (such as in FIGS. 2 and 5-8), the quick install tool 40 may be removably attached to the seat track fitting assembly 20 via the guide pin assembly 30. For example, the quick install tool 40 may be removably attached to the seat track fitting assembly 20 using the guide pin 31 by placing the holding member 48 (which has been omitted from FIGS. 5-7 to provide clarity in the figures) around the guide pin 31, or by inserting the guide pin 31 through the holding member 48, and inserting the cross bar 46 into the notch 34. As the guide pin 31 is inserted through the holding member 48, the guide pin 31 is captured between the holding member 48 and another portion of the quick install tool. For example, the guide pin 31 may be captured between the holding member 48 and the cross bar 46. Additionally, the cross bar 46 may be inserted or placed into the notch 34 of the guide pin 31. The inserting of the cross bar 46 into the notch 34 and the guide pin 31 into the holding member 48 secure the quick install tool 40 to the guide pin 31 and permit the quick install tool to lift and rotate the guide pin 31.

In some embodiments (such as in FIG. 5), when the quick install tool 40 is attached to the seat track fitting assembly 20, the handle 42 may be in a generally upright position. The quick install tool 40 may be positioned so that the cam profile 44 may face away from the fitting 22. A user may press the handle 42 downwards away from the fitting 22 and towards the track 12 (e.g., as illustrated by arrow 50 in FIG. 5). This movement of the handle 42 causes the guide pin assembly 30 to lift along the lift axis due to the shape of the cam profile 44 and the location of the cross bar 46 attachment relative to the first end 41 of the quick install tool 40. The axis of rotation of the cam profile 44 may extend through the cross bar 46 when the cross bar 46 is inserted into the notch 34 (e.g., because the notch holds the cross bar 46 in place relative to the guide pin 31 as the handle 42 rotates). Thus, the axis of rotation of the cam profile 44 may be non-concentric to the cam profile 44. As the handle 42 is pressed downwards and the cam profile 44 rotates, the guide pin 31 is lifted upwards from the retracted state to the extended state (e.g., transitioning from a state depicted in FIG. 5 to a state depicted in FIG. 6). The lifting of the guide pin 31 may be in opposition to a force provided by an associated compression of the biasing member 38.

Figure 6:
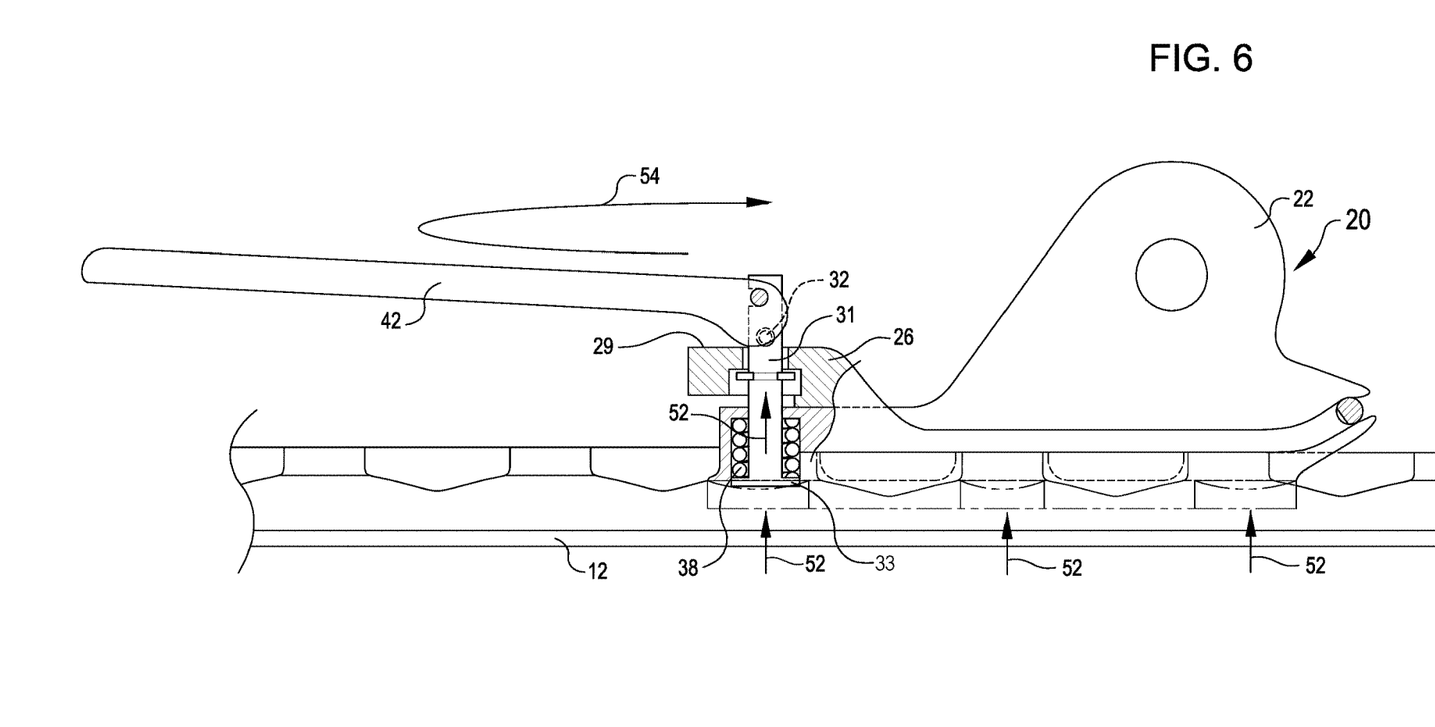
FIG. 6 is a side view of the elements of FIG. 2 with the quick install tool moved to a downwards position.
Figure 7:
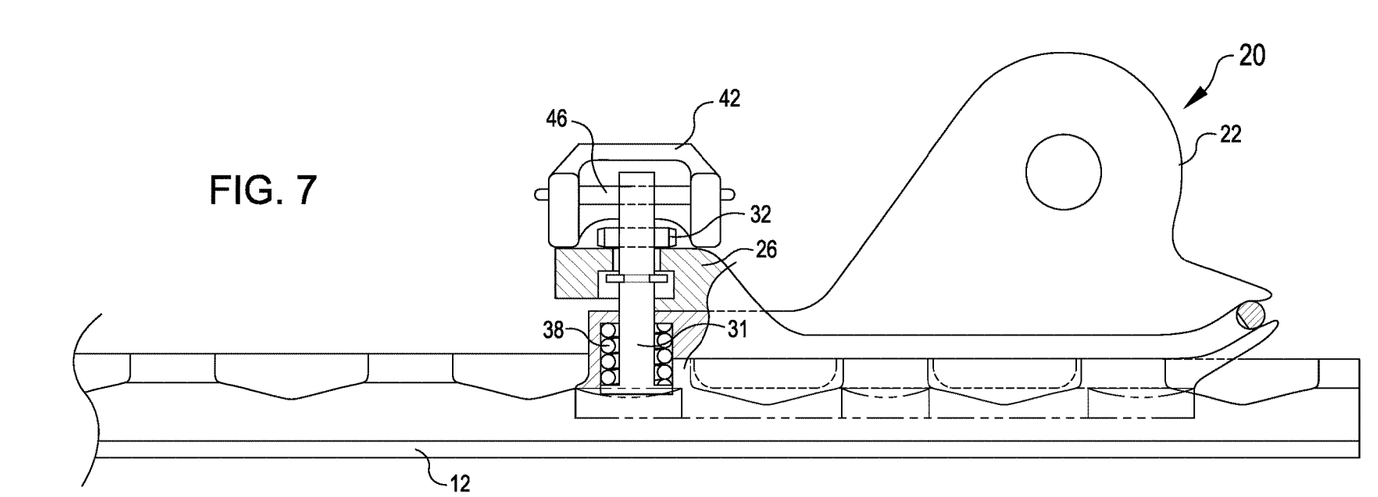
FIG. 7 is a side view of the elements of FIG. 2 with the quick install tool moved to a rotated position.
Figure 8:
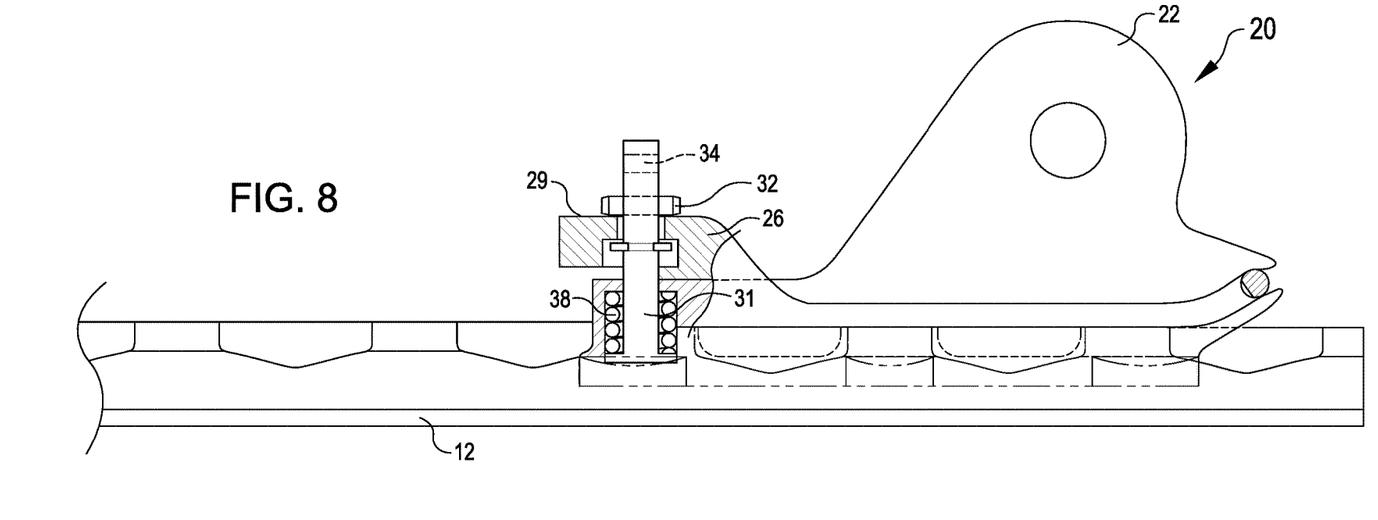
FIG. 8 is a side view of the elements of FIG. 2 with the quick install tool removed and with a guide pin of the seat track fitting assembly in a locked position.
Figure 9:
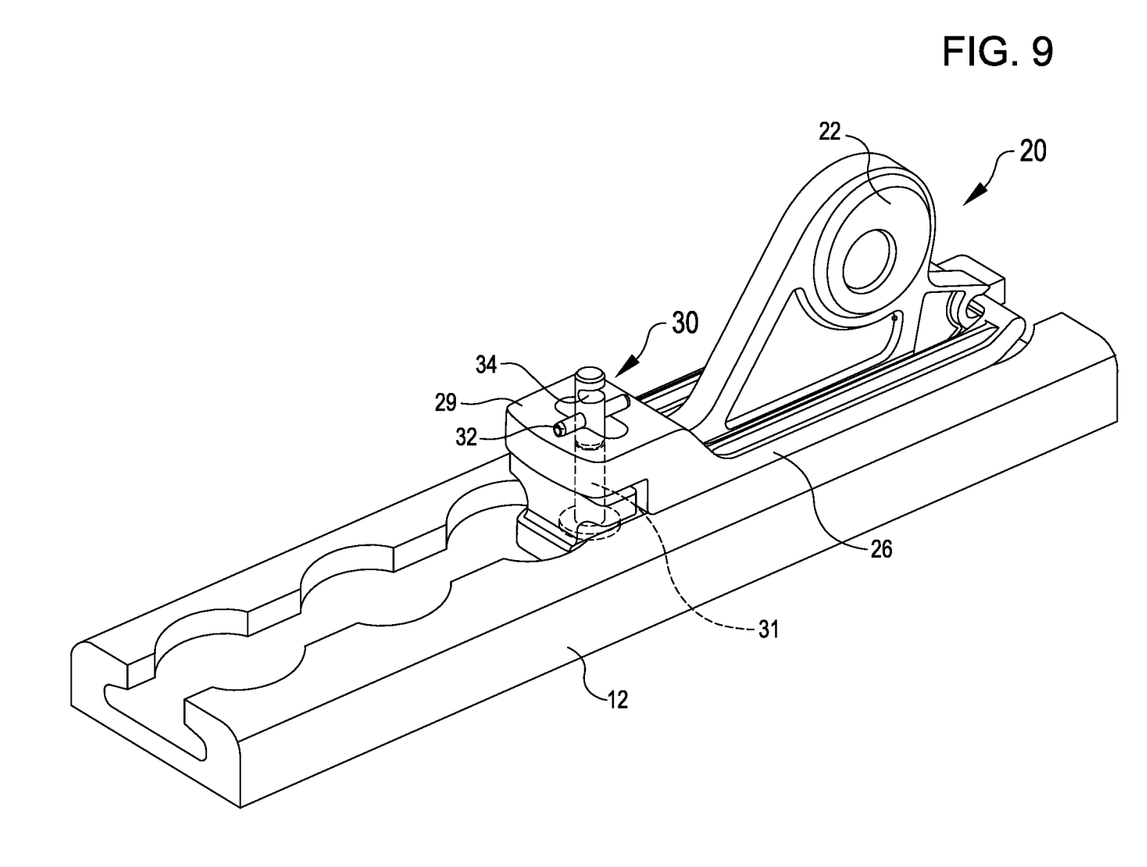
FIG. 9 is a perspective view of the elements of FIG. 8.

In some embodiments (such as in FIG. 6), as the guide pin 31 is lifted upwards, a resulting compression of the biasing member 38 and/or engagement with the flared portion 33 of the guide pin 31 exerts a lifting force on the fitting 22 to clamp the shear plunger 26 and the fitting 22 to the track 12 (as illustrated by arrows 52 in FIG. 6). Clamping the shear plunger 26 and the fitting 22 to the track 12 secures the seat track fitting assembly 20 to the track 12. The user may partially rotate the handle 42 about the lift axis while the guide pin 31 is in the lifted position (as illustrated by arrow 54 in FIG. 6), which may result in an accompanying twisting, or rotating, of the guide pin 31 about the lift axis so the locking member 32 engages the shear plunger locking surface 29 (such as in FIGS. 7-9). For example, the user may rotate the handle 42 by 45°, 90°, 135°, or any other suitable amount less than a 180° rotation where the locking member 32 is capable of engaging the shear plunger locking surface 29. In some embodiments (such as in FIGS. 7-9), the handle 42 is rotated 90° or less to engage the locking member 32 with the shear plunger locking surface 29. In some embodiments, the engagement of the locking member 32 with the shear plunger locking surface 29 may provide a secure interface that maintains a clamping force without being subject to separate retention mechanism limitations common in single-action fittings. For example, the locking member 32 may suitably engage the shear plunger locking surface 29 in a manner that is not significantly affected by the stiffness or other relevant characteristic of the biasing member 38, which may facilitate capability of tuning the level of clamping force provided by swapping out or otherwise varying a relevant characteristic of the biasing member 38.

In some embodiments (such as in FIGS. 8 and 9), the quick install tool 40 is removable from the seat track fitting assembly 20. After the guide pin 31 has been twisted about the lift axis so that the locking member 32 is engaged with the shear plunger locking surface 29 using the quick install tool 40, the handle 42 may be lifted upwards in a direction away from the track 12, and the quick install tool 40 may be removed from the guide pin 31. For example, the cross bar 46 may be removed from the notch 34, and the guide pin 31 may be removed from the space between the holding member 48 and the cross bar 46. The locking member 32 remains engaged with the shear plunger locking surface 29 after the quick install tool 40 is removed. Thus the seat track fitting assembly 20 remains secured to the track 12 due to the clamping force of the shear plunger 26 and the fitting 22.

In some embodiments (such as in FIG. 10), other form factors and/or features may be additionally or alternatively incorporated into the quick install tool 40 for actuating the guide pin 31. Such features may provide additional or alternative ways of actuating the guide pin 31 to cause the guide pin 31 to be lifted (as illustrated by arrow 52) and rotated (as illustrated by arrow 54). Some examples of different instances of the quick install tool 40 that feature different examples of such features are identified in FIG. 10 with different suffixes (such as -A, -B, -C, -D).

Figure 10:
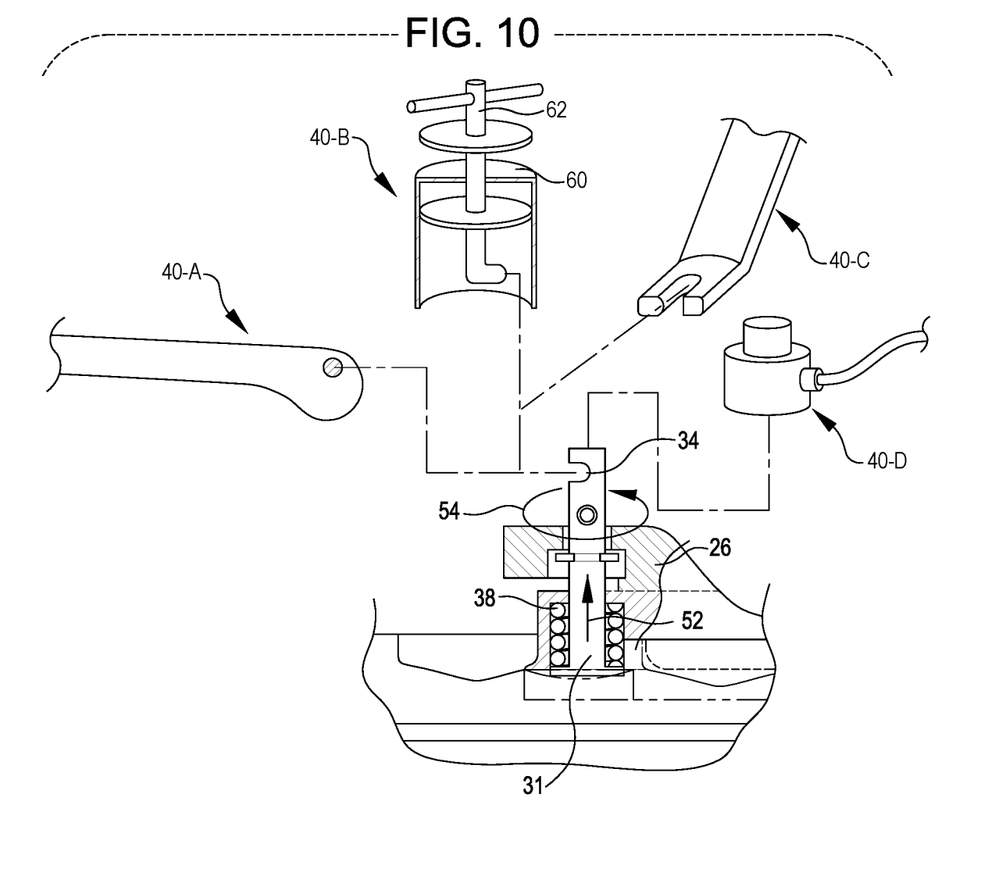
FIG. 10 is a partial side view of the seat track fitting assembly of FIG. 2 with a variety of quick install tools.

As one depicted example, the quick install tool 40-B may utilize a "syringe" type action so that the tool fits over the guide pin 31 and engages with the notch 34 while simultaneously exerting a downward force on the shear plunger to permit the lifting and rotating of the guide pin 31. For example, the quick install tool 40-B may include a body 60 and a handle 62. The quick install tool 40-B may be used to lift and rotate the guide pin 31 by positioning the body 60 on an upper surface of the shear plunger 26 and engaging the handle 62 with the guide pin 31. Using the body 60 to apply a downward force on the upper surface of the shear plunger 26 and pulling the handle 62 upwards (e.g., away from the upper surface of the shear plunger 26) relative to the body 60, the guide pin 31 may be lifted along the lift axis. Additionally, the guide pin 31 may be partially twisted about the lift axis by rotating the handle 62 relative to the body 60 of the quick install tool 40-B.

Among other examples, the quick install tool 40-C may include a forked lever that fits around the guide pin 31 and engages with the notch 34 to lift and rotate the guide pin 31. As a further example, the quick install tool 40-D may be a motorized, pneumatic, or automated tool that fits over the guide pin 31 and engages with the notch 34 to lift and rotate the guide pin 31. Additionally, the quick install tool 40-A includes similar features as the quick install tool 40 discussed previously with respect to FIGS. 2-7. As a further example, another quick install tool 100 is discussed below in relation to FIGS. 13 and 14.

In some embodiments (such as in FIGS. 11 and 12), the biasing member 38 may include a disc spring. The disc spring may be disposed in the same location as the compression spring (e.g., in an inner cavity of the fitting 22) or the disc spring may be disposed above the retaining member 37. Additionally, the biasing member 38 may include any suitable number of disc springs necessary to provide an adequate clamping force.

Figure 11:
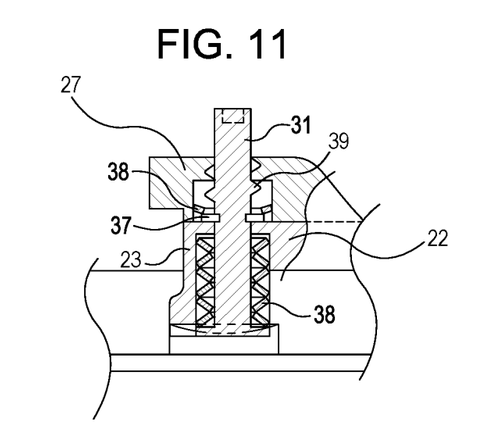
FIG. 11 is a partial side view of an example of the seat track fitting assembly of FIG. 2 with the guide pin in a retracted position.
Figure 12:
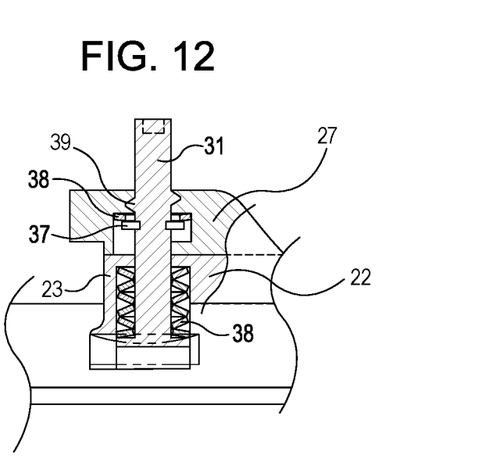
FIG. 12 is a partial side view of the elements of FIG. 11 with the guide pin in an extended position.

The guide pin 31 may additionally or alternatively include threads 39 to supplement and/or at least partially replace the action of the locking member 32. For example, the guide pin 31 may include threads 39 that interact with a portion of the fitting body 23 or a portion of the shear plunger body 27 as the guide pin 31 is rotated using a quick install tool 40. In some embodiments, the threads 39 may have a pitch that allows the guide pin 31 to travel from the retracted to the extended state in response to less than a full rotation of the guide pin 31. The threads 39 may provide supplemental engagement that may allow a clamping force to be greater than the clamping force in the absence of the threads 39.

In some embodiments (such as in FIGS. 13 and 14), the quick install tool 100 may include a handle 102 and a body 104 that may be moveable relative to one another. The handle 102 may be T-shaped and include a base that is cylindrical or otherwise shaped in a manner that may fully or partially surround the body 104. The top of the T-shape of the handle 102 may be formed by a disc, individual arms, or by any other extensions that provide the T-shape in cross-section, e.g., which may provide a suitable gripping surface for fingers in use, such as when a palm is pressed against the body 104.

The handle 102 may include an engaging member 106 positioned to engage with the notch 34 of the guide pin 31. For example, the engaging member 106 may be located on an inner surface and towards a lower end of the handle 102. The engaging member 106 may be a protrusion coupled with or formed with the inner surface of the handle 102. In some embodiments, the engaging member 106 may include an actuator 110 and a detent 108. The actuator 110 may be a spring or other biasing member. The detent 108 may be a ball, a rod, or any other suitably shaped object for positioning and holding one mechanical part in relation to another in a manner that may permit release in response to application of an appropriate magnitude and/or direction of force.

Additionally, the quick install tool 100 may include at least one rail 112 that aids in maintaining rotational alignment between the handle 102 and the body 104. For example, the rail 112 may be coupled with the handle 102, such as in FIG. 13, and the body 104 may include a corresponding channel that accepts the rail 112. In some embodiments, the rail 112 may be coupled with the body 104, and the handle 102 may include a corresponding channel that accepts the rail 112. In some embodiments, rotational alignment may be maintained without a rail 112, such as if the handle 102 and body 104 have a square cross-sectional shape or other shape that provides keying or indexing in a manner that prevents rotational movement between the handle 102 and body 104.

The body 104 may be shaped similar to the handle 102. In some embodiments, the body 104 may be partially disposed inside the handle 102. The handle 102 and the body 104 may be moveable relative to one another via a vertical translation. Additionally, a biasing member 120 may be included in the quick install tool 100 to assist with the movement of the handle 102 and the body 104. For example, the biasing member 120 may be a spring that is positioned around the body 104 and causes a biasing force to be applied to a top surface of the handle 102 and/or to an underside of the body 104.

Figure 13:
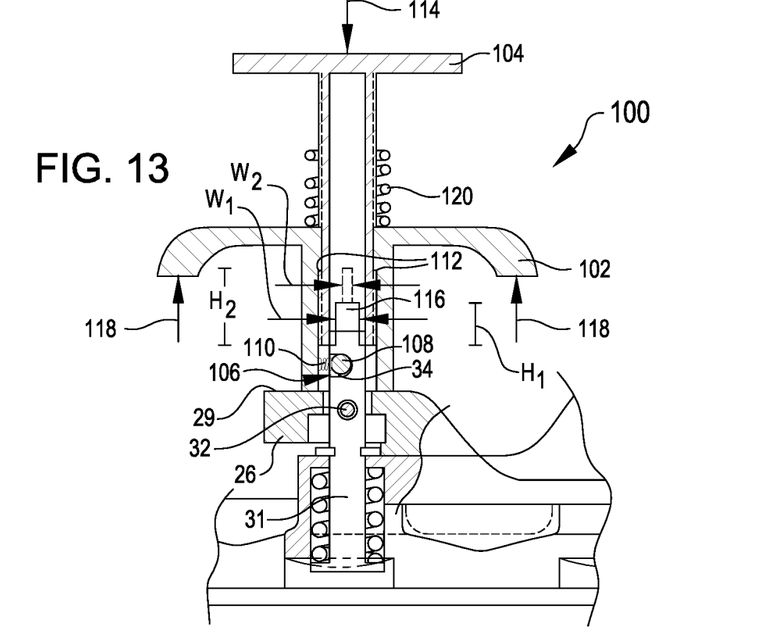
FIG. 13 is a partial side view of the seat track fitting assembly of FIG. 2 with a quick install tool, according to certain embodiments of the present invention.

In some embodiments, the body 104 may include at least one slot 116. The slot 116 may be a single height and width dimension or may be stepped with multiple height and width dimensions. For example, as seen in FIG. 13, the slot 116 may have a first height $H_1$ and a first width $W_1$ as well as a second height $H_2$ and a second width $W_2$ (e.g., shown in phantom lines). The first height $H_1$ and the first width $W_1$ may be sized to accept the locking member 32 into the slot 116 and permit the locking member 32 to translate a distance in the slot 116. The first height $H_1$ and the first width $W_1$ may additionally or alternatively be sufficiently large to accept the engaging member 106 into the slot 116 and permit the engaging member to translate a distance in the slot 116. The second height $H_2$ and the second width $W_2$ may be sized to accept the engaging member 106 and permit the engaging member 106 to translate a distance in the slot 116. Additionally, the second width $W_2$ may be sized to prevent the detent 108 from disengaging with the notch 34. In some embodiments, the body 104 includes two slots 116 radially spaced about a central axis from one another, where one slot 116 is the first height $H_1$ and the first width $W_1$ to accept the locking member 32 and the other slot 116 is the second height $H_2$ and the second width $W_2$ to accept the engaging member 106. One example of an arrangement with multiple slots 116 is shown in solid lines in FIGS. 13-14, e.g., with a first slot 116 with the first height $H_1$ and the first width $W_1$ visible in one state of the quick install tool 100 in FIG. 13 and a second slot 116 with the second height $H_2$ and the second width $W_2$ visible in a rotated state of the quick install tool 100 in FIG. 14.

Overall, the quick install tool 100 may operate to raise and twist the guide pin 31 to engage the locking member 32 with the shear plunger locking surface 29. An example sequence of actions that may be performed to accomplish this overall result will now be described. As may be appreciated with initial reference to FIG. 13, the handle 102 may be placed over the guide pin 31 such that a lower surface of the handle 102 is proximate to the shear plunger 26. In some embodiments, such movement may cause the engaging member 106 to engage with the notch 34 of the guide pin 31. For example, the actuator 110 may permit the detent 108 to deflect and be pushed aside by a part of the guide pin 31 above the notch 34 and then bias the detent 108 into the notch 34 (e.g., upon reaching a position level with the notch 34).

With the handle 102 engaged with the guide pin 31, the body 104 may be vertically translated by applying a downward force (as illustrated by arrow 114) such that a lower surface of the body 104 comes into contact with the shear plunger locking surface 29. As the body 104 is translated, the at least one slot 116 (e.g., visible in FIG. 14 but rotated out of view in FIG. 13) can receive part of the engaging member (e.g., the actuator 110) and thus permit part of the engaging member 106 to move through the body 104. In addition, the sizing of the at least one slot 116 may be smaller in width than a corresponding dimension of the detent 108 and thus may physically obstruct movement of the detent 108 and prevent the detent 108 from disengaging from the notch 34 while the body 104 remains in a lowered state. The downward force illustrated by arrow 114 (e.g., FIG. 13) may continue to be applied to the body 104 while a simultaneous upward force is applied to the handle 102 (as illustrated by arrows 118), which can result in the handle 102 moving away from the shear plunger 26 and the guide pin 31 lifting along the lift axis. As the guide pin 31 is raised, the engaging member 106 and the locking member 32 may translate within the corresponding slot(s) 116 in the body 104.

Figure 14:
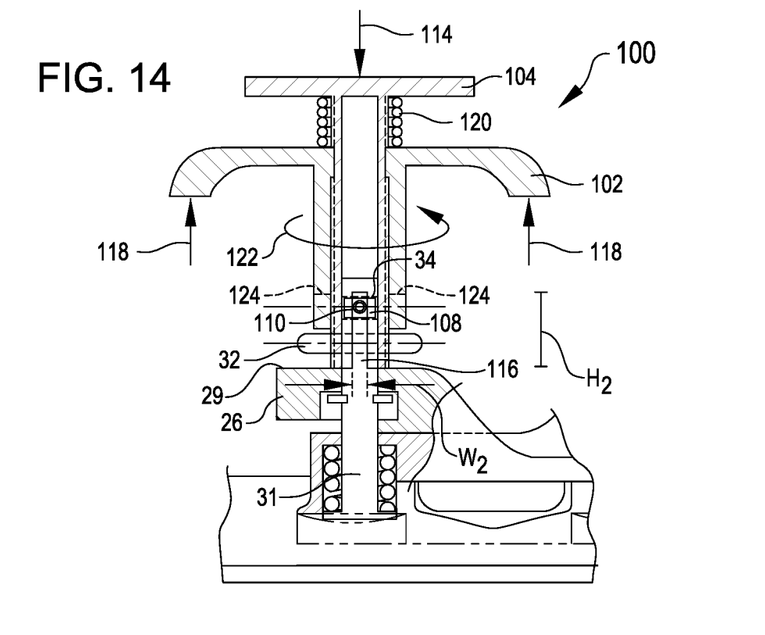
FIG. 14 is a partial side view of the seat track fitting assembly of FIG. 13 with the guide pin and quick install tool rotated 90°.

As may be appreciated with reference next to FIG. 14, the guide pin 31 may be rotated about the lift axis by turning or rotating (as illustrated by arrow 122) either the body 104 or both the handle 102 and the body 104. The guide pin 31 may undergo a corresponding rotation due to the engagement of the engaging member 106 with the notch 34 and/or the engagement of the locking member 32 with sides of the slot 116. The locking member 32 may engage with the shear plunger locking surface 29 as the guide pin 31 is rotated.

The upward force applied on the handle 102 (as illustrated by arrows 118 in FIG. 13) may stop being applied or otherwise be released following the rotation of the guide pin 31 that brings the locking member 32 into engagement with the shear plunger locking surface 29 (e.g., upon reaching a state shown in FIG. 14). As a result, the biasing member 120 may apply a force to move the handle 102 towards the shear plunger 26. In some embodiments, the handle 102 may include handle slots 124 that accept the locking member 32 as the lower surface of the handle 102 is positioned proximate to the shear plunger locking surface 29. The biasing member 120 may then apply a force to move the body 104 upwards away from the shear plunger 26. In some embodiments, the upward movement of the body 104 may permit the engaging member 106 to disengage from the notch 34, and the quick install tool 100 may be removed from the guide pin 31.

Other variations are also possible. For example, in some embodiments (including the views of FIGS. 13 and 14), the notch 34 and the locking member 32 may be positioned such that the corresponding longitudinal axis of each, as shown in dot dash lines in FIG. 14, are parallel. However, it is understood that the longitudinal axis of the notch 34 or the locking member 32 may be rotated away from the other about the lift axis. For example, the longitudinal axis of the notch 34 may be perpendicular to the longitudinal axis of the locking member 32 in some embodiments. In some such embodiments, the use of a single slot 116 may be particularly suitable, e.g., as such an arrangement may permit the engaging member 106 and the locking member 32 to be both received in the same single slot 116 in response to movement of the body 104. Moreover, although the first width $W_1$ is depicted as larger than the second width $W_2$ in FIGS. 13-14, the assorted dimensions of the slots could be equal to one another or otherwise varied to accommodate differences in other associated components such as the detent 108, actuator 110, and/or locking member 32. Furthermore, although the engaging member 106 is described above as primarily engaging the notch 34 of the guide pin 31 in response to action of the actuator 110, the engaging member 106 may additionally or alternatively be engaged in the notch 34 at least partially in response to lateral translation of the quick install tool 100. For example, a user during installation may align the quick install tool 100 with a side of the guide pin 31 opposite the notch 34 (e.g., the right side in FIG. 13) in a manner that may leave suitable space for the detent 108 to be lowered past a top of the guide pin 31 to reach the level of the notch 34 and then laterally translate the detent 108 into the notch 34 (e.g., move rightward in FIG. 13) and into a position that can be retained by lowering the body 104 as described above. In some embodiments, an engaging action based on lateral translation may be implemented in a quick action tool 100 that lacks an actuator 110 or otherwise has a detent 108 that is fixed relative to the body 104.

In the following, further examples are described to facilitate the understanding of the invention:

Example #1. A system for securing a passenger seat to a track (which may incorporate features of any of the subsequent examples), the system comprising:
  a fitting coupled with or forming a portion of the passenger seat, the fitting comprising a fitting body defining a fitting opening;
  a shear plunger coupled with the fitting, the shear plunger comprising a shear plunger body defining a shear plunger opening and a shear plunger locking surface adjacent at least a portion of the shear plunger opening; and
  a guide pin assembly comprising:
    a guide pin received at least partially in the fitting opening and movable along a lift axis between a retracted state and an extended state; and
    a locking member extending laterally from the guide pin and sized for traveling through at least a portion of the shear plunger opening in response to a movement of the guide pin from the retracted state to the extended state, wherein the locking member engages the shear plunger locking surface in response to a rotation of the guide pin in the extended state.

Example #2. The system of Example #1 or any of the preceding or subsequent examples, wherein the fitting comprises at least one stud extending from a lower portion of the fitting and configured to contact a lower surface of the track in response to the movement of the guide pin from the retracted state to the extended state to clamp the shear plunger and the fitting to the track.

Example #3. The system of Example #1 or any of the preceding or subsequent examples, wherein the guide pin assembly further comprises a biasing member biasing the guide pin toward the retracted state.

Example #4. The system of Example #1 or any of the preceding or subsequent examples, wherein the fitting opening and the shear plunger opening align as a result of a pivoting of the shear plunger body relative to the fitting body to permit the guide pin to extend at least partially through both the fitting opening and the shear plunger opening in the extended state and in the retracted state.

Example #5. The system of Example #1 or any of the preceding or subsequent examples, wherein the guide pin comprises a locking member opening in which the locking member is received.

Example #6. The system of Example #1 or any of the preceding or subsequent examples, wherein the guide pin comprises a flared portion at or adjacent a distal segment of the guide pin, a notch located at or adjacent a proximal segment of the guide pin, and a retaining section located between the notch and the flared portion.

Example #7. The system of Example #6 or any of the preceding or subsequent examples, wherein the retaining section comprises a portion of the guide pin with a diameter that is smaller than the diameter of the guide pin adjacent to the retaining section and the guide pin assembly further comprises a retaining member coupled with the retaining section.

Example #8. The system of Example #1 or any of the preceding or subsequent examples, further comprising a quick install tool operable to raise and twist the guide pin assembly such that the locking member is held in tension against the shear plunger locking surface.

Example #9. The system of claim 8, wherein the quick install tool comprises:
   a body defining at least one slot; and
   a handle positioned to at least partially surround the body and comprising an engaging member sized to engage a notch of the guide pin;
   wherein the slot is sized to permit at least one of the engaging member or the locking member to translate along a longitudinal distance of the slot.

Example #10. The system of Example #8 or any of the preceding or subsequent examples, wherein the quick install tool comprises:
   a handle;
   a cam profile;
   a cross bar sized to engage a notch of the guide pin; and
   a holding member spaced apart from the cross bar to define a space for receiving the guide pin.

Example #11. The system of Example #10 or any of the preceding or subsequent examples, wherein the quick install tool is removably attached to the guide pin by placing the holding member around the guide pin and inserting the cross bar into the notch in the guide pin.

Example #12. A quick install tool (which may incorporate features of any of the preceding or subsequent examples) comprising:
   a handle having a first end and a second end;
   a cam profile along the first end of the handle;
   a cross bar coupled with the first end of the handle and sized to engage a notch; and
   a holding member spaced apart from the cross bar to define a space between the cross bar and the holding member for receiving a pin-shaped member.

Example #13. The quick install tool of Example #12 or any of the preceding or subsequent examples, wherein the cross bar is attached away from a geometric center of the cam profile such that an axis of rotation of the cam profile extending through the cross bar is non-concentric to the cam profile to facilitate a lifting of a guide pin.

Example #14. The quick install tool of Example #12 or any of the preceding or subsequent examples, wherein the quick install tool is configured to secure a seat track fitting assembly to a track by the quick install tool raising and twisting a guide pin of the seat track fitting assembly to clamp a shear plunger of the seat track fitting assembly and a fitting member of the seat track fitting assembly to the track.

Example #15. The quick install tool of Example #14 or any of the preceding or subsequent examples, wherein the quick install tool is configured to operate relative to a guide pin assembly that comprises the guide pin, a biasing member, and a locking member, wherein
   the notch is located on the guide pin;
   the quick install tool is configured to engage the guide pin by inserting the guide pin through the holding member and inserting the cross bar into the notch on the guide pin; and
   the quick install tool so engaged with the guide pin is operable to (a) perform the raising of the guide pin to lift the guide pin against a force exerted by the biasing member and (b) perform the twisting of the guide pin to cause engagement of the locking member.

Example #16. A method for securing a passenger seat to a track (which may incorporate features of any of the preceding or subsequent examples), the method comprising:
   relative to a passenger seat track fitting assembly that forms or is coupled with a portion of the passenger seat, lifting a guide pin of the passenger seat track fitting assembly to a lifted position along a lift axis; and
   twisting the guide pin in the lifted position at least partially about the lift axis to align a locking member of the guide pin for engagement with a shear plunger locking surface of a shear plunger.

Example #17. The method of Example #16 or any of the preceding or subsequent examples, further comprising:
   attaching a quick install tool to the passenger seat track fitting assembly, wherein the lifting the guide pin is performed using the quick install tool, and wherein the twisting the guide pin is performed using the quick install tool.

Example #18. The method of Example #17 or any of the preceding or subsequent examples, wherein attaching the quick install tool to the passenger seat track fitting assembly comprises:
   placing the quick install tool on the guide pin such that the guide pin is captured between a holding member of the quick install tool and another portion of the quick install tool; and
   inserting a cross bar of the quick install tool into a notch of the guide pin.

Example #19. The method of Example #17 or any of the preceding or subsequent examples, wherein:
   lifting the guide pin of the passenger seat track fitting assembly along the lift axis using the quick install tool comprises pressing a handle of the quick install tool downwards;

twisting the guide pin at least partially about the lift axis using the quick install tool comprises rotating the handle at least partially about the lift axis; and wherein the method further comprises removing the quick install tool from the passenger seat track fitting assembly, wherein removing the quick install tool from the passenger seat track fitting assembly comprises:

lifting the handle upwards; and removing the quick install tool from the guide pin.

Example #20. The method of Example #17 or any of the preceding or subsequent examples, wherein the method further comprises engaging a body of the quick install tool with an upper surface of the shear plunger and applying a downward force on the upper surface of the shear plunger via the body of the quick install tool, and wherein:

lifting the guide pin of the passenger seat track fitting assembly along the lift axis using the quick install tool comprises pulling a handle of the quick install tool upwards relative to the body of the quick install tool; and twisting the guide pin at least partially about the lift axis using the quick install tool comprises rotating the handle of the quick install tool relative to the body of the quick install tool.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A system for securing a passenger seat to a track, the system comprising:
    a fitting coupled with or forming a portion of the passenger seat, the fitting comprising a fitting body defining a fitting opening;
    a shear plunger coupled with the fitting, the shear plunger comprising a shear plunger body defining a shear plunger opening and a shear plunger locking surface adjacent at least a portion of the shear plunger opening; and
    a guide pin assembly comprising:
        a guide pin received at least partially in the fitting opening and movable along a lift axis between a retracted state and an extended state; wherein the guide pin comprises a notch located at or adjacent a proximal segment of the guide pin; and
        a locking member extending laterally from the guide pin and sized for traveling through at least the portion of the shear plunger opening in response to a movement of the guide pin from the retracted state to the extended state, wherein the locking member engages the shear plunger locking surface in response to a rotation of the guide pin in the extended state.

2. The system of claim 1, wherein the fitting comprises at least one stud extending from a lower portion of the fitting and configured to contact a lower surface of the track in response to the movement of the guide pin from the retracted state to the extended state to clamp the shear plunger and the fitting to the track.

3. The system of claim 1, wherein the guide pin assembly further comprises a biasing member biasing the guide pin toward the retracted state.

4. The system of claim 1, wherein the fitting opening and the shear plunger opening align as a result of a pivoting of the shear plunger body relative to the fitting body to permit the guide pin to extend at least partially through both the fitting opening and the shear plunger opening in the extended state and in the retracted state.

5. The system of claim 1, wherein the guide pin comprises a locking member opening in which the locking member is received.

6. The system of claim 1, wherein the guide pin comprises a flared portion at or adjacent a distal segment of the guide pin and a retaining section located between the notch and the flared portion, wherein the retaining section comprises a portion of the guide pin with a diameter that is smaller than the diameter of the guide pin adjacent to the retaining section and the guide pin assembly further comprises a retaining member coupled with the retaining section.

7. The system of claim 1, further comprising a quick install tool operable to raise and twist the guide pin assembly such that the locking member is held in tension against the shear plunger locking surface.

8. The system of claim 7, wherein the quick install tool comprises:
    a body defining at least one slot; and
    a handle positioned to at least partially surround the body and comprising an engaging member sized to engage the notch of the guide pin;
    wherein the slot is sized to permit at least one of the engaging member or the locking member to translate along a longitudinal distance of the slot.

9. The system of claim 7, wherein the quick install tool comprises:
    a handle;
    a cam profile;
    a cross bar sized to engage the notch of the guide pin; and
    a holding member spaced apart from the cross bar to define a space for receiving the guide pin.

10. The system of claim 9, wherein the quick install tool is removably attached to the guide pin by placing the holding member around the guide pin and inserting the cross bar into the notch in the guide pin.

* * * * *